INVENTOR.
HERMAN G. KRAUT
BY
*Peter L. Costas*
ATTORNEY

Sept. 6, 1966  H. G. KRAUT  3,270,482
METHOD AND APPARATUS FOR SKIN PACKAGING ARTICLES
AND PACKAGES FORMED THEREBY
Filed Oct. 31, 1963  5 Sheets-Sheet 5

INVENTOR.
HERMAN G. KRAUT
BY
ATTORNEY

United States Patent Office 3,270,482
Patented Sept. 6, 1966

3,270,482
METHOD AND APPARATUS FOR SKIN PACKAGING ARTICLES AND PACKAGES FORMED THEREBY
Herman G. Kraut, New Britain, Conn., assignor to The Stanley Works, New Britain, Conn., a corporation of Connecticut
Filed Oct. 31, 1963, Ser. No. 320,260
22 Claims. (Cl. 53—30)

The present invention relates to packaging, and more particularly, to a novel method and apparatus for skin-packaging articles between a substrate and a thermoplastic film, and to the novel and attractive packages formed thereby.

Skin-packaging has achieved substantial commercial success as a means of visually displaying articles and also as a method of protecting them. Generally, skin-packaging employs an air-pervious substrate upon which the article is supported and a thermoplastic film which is heated to render it deformable. Suction is drawn through the substrate to draw and deform the film into a sheath about the article and into laminar contact with the substrate surrounding the article.

In accordance with earlier practice and as exemplified by United States Patent Number 2,855,735, a thermoplastic adhesive coating or laminate is provided upon the opposing surfaces of the substrate or the film which is activated directly by the heater utilized to render the film deformable or by the heated film when it is brought into contact with the adhesive coating upon the substrate. More recently, the use of adhesive coatings or laminates has been obviated by the discovery that surface treated polyolefin films may be bonded directly to a porous paperboard substrate by their own substance as described in applicant's United States Patent Number 3,031,072.

Generally, skin-packaging has gained widespread acceptance but has met resistance in application to products fabricated of material or having surface portions which may be injuriously affected by the heating required to render the film deformable. Prior attempts to solve aspects of the problem are disclosed in United States patents, Number 2,861,404, Number 2,958,172, and Number 2,989,827. The method of the first patent is subject to the disadvantages that it is not susceptible to speedy operation and that the film does not closely conform to the shielded area by reason of the interference of the shield. The method of the last two patents is subject to more speedy operation but is also subject to the disadvantage that the film does not closely conform to the product if the shield protects the entire product area since the film is not rendered deformable, which, however may be advantageous for certain products.

It is an object of the present invention to provide a novel method for skin-packaging articles between an air-pervious substrate and a thermoplastic film which is rapid in operation and which protects the articles from the heating unit.

Another object is to provide such a method for skin-packaging articles wherein the film is uniformly and rapidly heated to plasticity.

It is also an object to provide such a method which is adaptable to existing apparatus and to semi-automatic packaging operations.

Still another object is to provide apparatus for skin-packaging articles which protects the articles being packaged from the heating unit and which is rapid in operation.

A further object is to provide relatively economical apparatus wherein the film is uniformly and rapidly heated to plasticity.

A still further object is to provide a novel and attractive skin-package containing an article having a surface portion susceptible to injury by heat wherein the article is substantially free from any heat injury.

Other objects and advantages will be apparent from the following detailed description and claims and the attached drawing wherein:

FIGURE 8 is a fragmentary cross-sectional view of a support member and skin-packaging sub-assembly of FIGURES 1–4 to a greatly enlarged scale.

Figure 1:
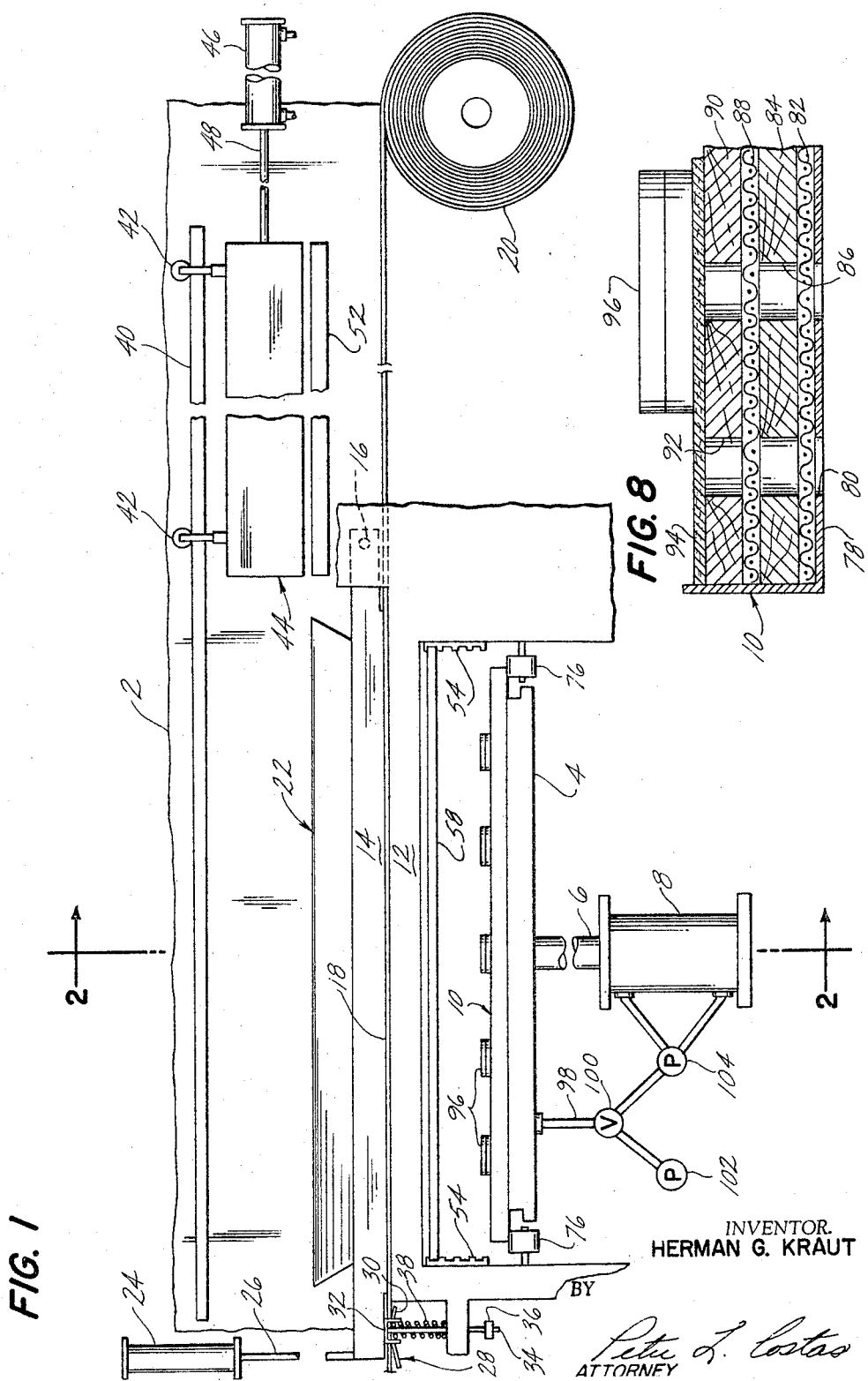
FIGURE 1 is a fragmentary front elevational and partially diagrammatic view of apparatus embodying the present invention with portions of the apparatus broken away for clarity of illustration.

It has now been found that the foregoing and related objects may be readily attained by a method of skin-packaging including the steps of placing an article on the upper surface of an air-pervious substrate to form a packaging assembly and supporting a length of thermoplastic film about its margins in spaced, generally parallel relationship above the sub-assembly. A heat-resistant shield member dimensioned and configured to overlie substantially all of the packaging sub-assembly is supported between the film and the sub-assembly and heat is directed downwardly into the film sufficient to heat the film to deformability with the shield member shielding the article and packaging sub-assembly from the heat. The shield member is withdrawn from between the heated film and packaging sub-assembly which are then moved into contact while a vacuum is being drawn through the substrate to draw the film into a close-fitting sheath about the article and into laminar contact with the substrate surrounding the article where it is bonded to the substrate.

Although the above method may be desirably employed with films having an adhesive coating or laminate, the most desirable films employed are polyolefins having at least their lower surface at least partially oxidized or surface-treated to render the lower surface more susceptible to activation by heat than the body of the film as disclosed and claimed in applicant's aforementioned United States Patent Number 3,031,072. Generally, such films may have their surface oxidized during the process of extrusion, electrostatically- chemically- or flame-treated, or otherwise treated to provide the desired surface characteristics. The present method also may be applied to techniques using an adhesive coating or laminate upon the board with somewhat greater difficulty if the adhesive coating or laminate is sufficiently heat-sensitive to be activated by the heated film upon contact therewith or by a relatively short period of exposure to the heat source upon withdrawal of the heat-shield member which will avoid damage to the article or to be activated by residual or environmental heat in the apparatus.

By using a heat shield member having a reflective upper surface, it has been found that not only are the articles protected from heat injury but also that the shield member reflects back the energy into the film to provide greater conservation of energy, greater uniformity of heating of the film, and reduction in the period of time for heating of the film to deformability. Where the lower surface of the film is surface-treated in accordance with applicant's aforementioned patent or where the film has an adhesive coating or laminate upon its lower surface, the method using the reflective shield member generally ensures uniform activation of the treated surface or adhesive coating or laminate and thus facilitates optimum bonding while avoiding excessive heating of the body of the film.

Although the shield member preferably is withdrawn after or simultaneously with the termination of the energy input to the heat source, it may be desirable on occasion to continue the heating for a relatively short period after withdrawal of the shield member to warm the upper surface of the substrate or to prevent premature chilling of the film, to assist in activating an adhesive coating or laminate upon the upper surface of the substrate or to assist in maintaining a high degree of plasticity in thicker films as the vacuum is being drawn when a deep draw is to be effected. However, the period should be sufficiently limited to avoid any adverse effect upon the articles being packaged or upon the substrate.

After completion of the drawing of the film into a sheath about the article and into laminar contact and bonding with the surface of the substrate about the article, the packaging assembly is desirably cooled by circulation of cool air over the film and by the blasting of air against the substrate, thus minimizing any injury to the article which might occur from the residual heat in the film.

The method of the present invention is conveniently performed in apparatus having a frame with clamping means for supporting a length of thermoplastic film about its margins and support means for a skin-packaging sub-assembly below the clamping means. Heating means are provided above the clamping means for heating a length of film clamped therein to deformability and a heat shield member is mounted for movement into an operative position between the clamping means and support means and into an operative position outwardly of the support means. The support means generally comprises an elevatable platform providing a conduit for drawing a vacuum although in some apparatus the clamping means may be lowered relative to the support for the packaging sub-assembly.

Generally, the films used for the present invention may be of a thickness of about 2–11 mils, and preferably about 3–7 mils depending upon the degree of distention or draw required to form the sheath about the article and the weight of the article. Heavier gauge films may be employed albeit with greater cost and longer periods of heating to achieve the desired deformability, which periods, however, are reduced by the reflective heat shield member. The preferred films are surface-treated polyolefins as described in applicant's aforementioned patent, and, particularly, surface-treated polyethylene films of about 3–7 mils in thickness.

Although perforated, relatively non-porous materials may be employed for the air-pervious substrate where adhesive coatings or laminates are employed to effect bonding, the preferred and ideal substrates are porous paperboard sheet material which will permit the drawing of a vacuum therethrough and which preferably are free from an adhesive coating. Most desirably, the paperboard is only lightly calendared to preserve the inherently porous, gas permeable nature throughout which provides optimum bonding throughout the area of laminar contact with the film. A suitable paperboard stock, for example, is the type known in the trade as "patent coated" which has a face or top layer composed essentially of virgin pulp and high grade waste free of ground wood and presenting an attractive finish and appearance. Alternatively, other types of porous paperboard sheet material including corrugated board may be employed. In the event a colored background or base color is to be used to provide an attractive appearance, it is most desirable to select a paperboard sheet material which has been vat dyed with the desired color during its manufacture to eliminate the necessity for printing the background color upon the paperboard.

When the bonding of the film to the paperboard is by the substance of the film itself as set forth in applicant's aforementioned patent, care should be taken to select printing inks for the paperboard which will not unduly interfere with the bonding process since certain inks contain sufficiently high quantities of binders or fillers to interfere with the porosity of the paperboard stock or to otherwise interfere with the bonding operations. Similarly, when the bonding of the film is by the substance of the film itself, the substrate should be substantially imperforate in the area of laminar contact to achieve optimum uniformity of bonding throughout the area of laminar contact. However, incidental perforations may also be incorporated for purposes of hanging the packages, or for tearing the substrate by the user to open the package, or about the article to permit more rapid draw of the film about the article into a sheath as may be desirable when the article is large and requires a large degree of draw. Where an adhesive coating or laminate is employed to effect the bond, the substrate may be non-porous and the area of surface contact may contain perforations as are often utilized to permit drawing a vacuum therethrough. In either instance, the substrate should be of sufficient rigidity for the packaging application.

Although the heat shield member may be of somewhat lesser dimension than that of the entire packaging sub-assembly, so long as it protects the article(s) being packaged and extends outwardly therefrom to permit uniform heating of the film throughout the area of laminar contact in the final package, it is preferable for the heat shield member to underlie the entire area of the film in the clamping or supporting means to ensure uniform and thorough heating and to overlie all of the packaging assembly to minimize heat passage thereby by convection or otherwise. Generally, the minimum and preferred dimensioning and configuration are encompassed by the terminology used herein "dimensioned and configured to overlie substantially all of said skin-packaging sub-assembly" since the effective area of product and bonding of the skin-packaging sub-assembly is contemplated. Moreover, when a plurality of articles are supported upon the substrate in accordance with commercial practice, the heat shield member is dimensioned and configured to overlie all of said articles and the area therebetween as well as sufficient of the marginal area of the substrate outwardly therefrom to ensure uniform bonding as well as freedom from heat injury to the articles.

The period of heating of the film will vary with the particular heat source, the particular film, its susceptibility to heat, its thickness, the degree of draw, and the nature of any adhesive coating or laminate which may be employed. Generally, with a "Calrod" type heating unit developing a temperature of about 1200° Fahrenheit and spaced about 8 inches above the film, the heating cycle will vary from about 2 to 12 seconds with a period of about 2½ to 7 seconds being satisfactory for most applications. With the reflective shield member, the cycle required for a particular film and draw may be reduced about 30–60 percent from that without the shield member. The exact length of the heating cycle is best determined by trial although visual observation of distention of the film under its own weight is indicative of a proper heating period. As indicated previously, the heating cycle preferably terminates at or prior to withdrawal of the heat shield member although it may continue for a relatively short period thereafter to assist in effecting optimum draw or bonding so long as the heat generated during the continuing period is insufficient to injure the articles being packaged.

The suction applied to the bottom of the substrate should be sufficient to distend the film into a sheath about the articles and to draw the film into tight surface contact with the substrate. In the instance of the method of applicant's aforementioned patent, the suction should be sufficient to draw the surface of the film into the pores of the paperboard. In a commercial embodiment, vacuum rated at about 23 inches of mercury (about 11.5 pounds per square inch) has proven highly satisfactory. The actual amount of vacuum will vary with the permeability or porosity of the substrate and the conditions of operation. Generally, the vacuum is applied for 2 to 20 seconds to bring the film and substrate into firm bonding, a period of 3 to 5 seconds being satisfactory for most operations.

Referring now in detail to the attached drawings, FIG-URES 1–5 fragmentarily and partially diagrammatically illustrate apparatus embodying the present invention including an apparatus frame 2 and a platform 4 mounted for vertical movement within the frame 2 on the shaft 6 which is operated by the air cylinder 8. The platform 4 is a hollow member open at the top and having a gasket or seal (not shown) of resilient material about the upper periphery thereof to provide a seal against the bottom surface of the perforate support member disposed thereon and generally designated by the numeral 10 and which will be described in detail hereinafter.

Aligned above the platform 4, the frame has a generally rectangular clamp portion 12 cooperating with the clamping frame 14 which is pivotally mounted on the frame 2 thereabove by the pivot pin 16 to clamp a length of thermoplastic film 18 therebetween as it is fed from the feed roll 20 at the right hand side of the apparatus as seen in FIGURE 1. Both the clamping frame 14 and the clamp portion 12 are dimensioned to engage the side margins of the film 18 as well as the ends thereof and have generally aligned, large rectangular apertures therein to expose the major portion of the film 18 clamped therebetween. The clamping frame 14 carries a heat reflector 22 extending about its upper surface which has an inwardly inclined peripheral wall to collect and deflect heat into the film 18 clamped therein. The clamping frame 14 is pivotable about the pin 16 into clamping relationship or into film releasing position by the air cylinder 24 and the piston 26 engaged with the free end thereof.

Figure 5:
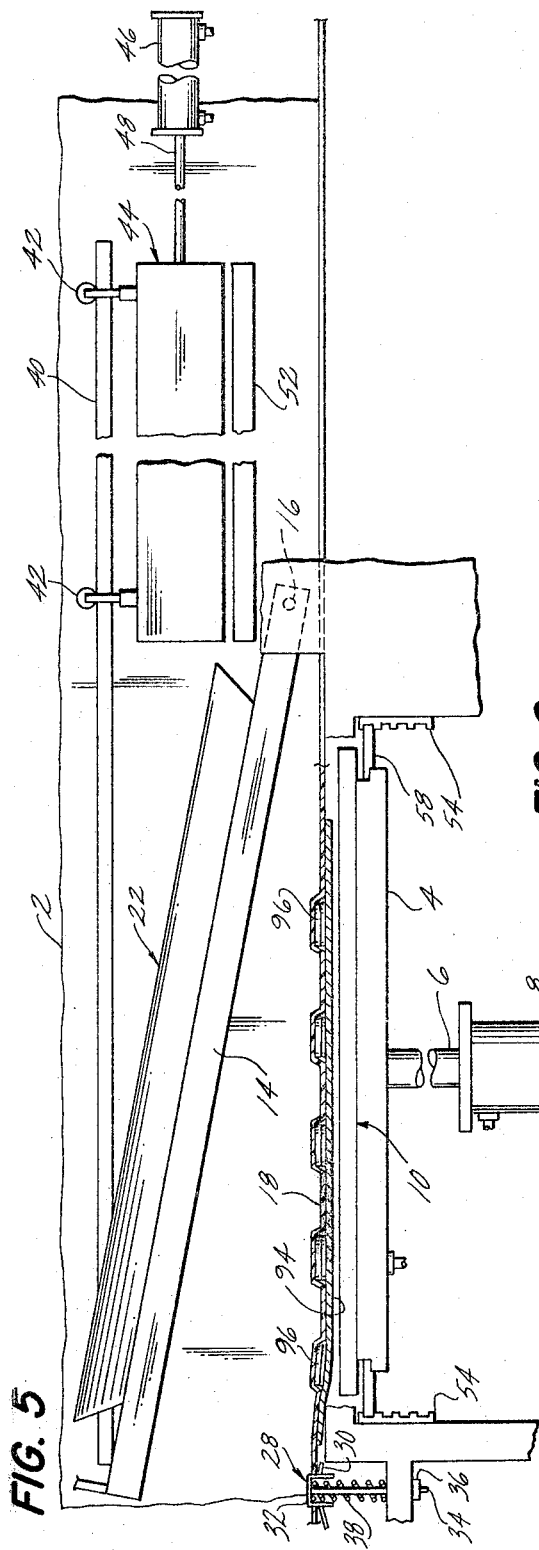
FIGURE 5 is a fragmentary front elevational and partially diagrammatic view of the apparatus as the skin-packaging assembly is being discharged.

As seen in FIGURE 1, when the clamping frame is moved into clamping position, the free end thereof depresses the release bar assembly generally designated by the numeral 28. The release bar assembly includes a table element 30 extending transversely under the film 18 which is supported at its ends upon yoke members 32 and depending spring guide bars 34 which extend downwardly through apertures (not shown) in the frame 2 and have stop members 36 on their lower ends. The release bar assembly 28 is normally biased upwardly by the helical, resiliently compressible spring members 38 which are coiled about the guide bars 34 and act between the frame 2 and the yoke member 32. The release bar assembly 28 is held in general alignment with the upper surface of the clamp portion 12 by the clamping frame 14 when it is in clamping position but is biased upwardly upon release of the clamping frame 14 from clamping engagement to lift the film 18 thereon above the level of the upper surface of the clamp portion 12 as seen in FIGURE 5 and facilitate removal of the packaging assembly.

Figure 3:
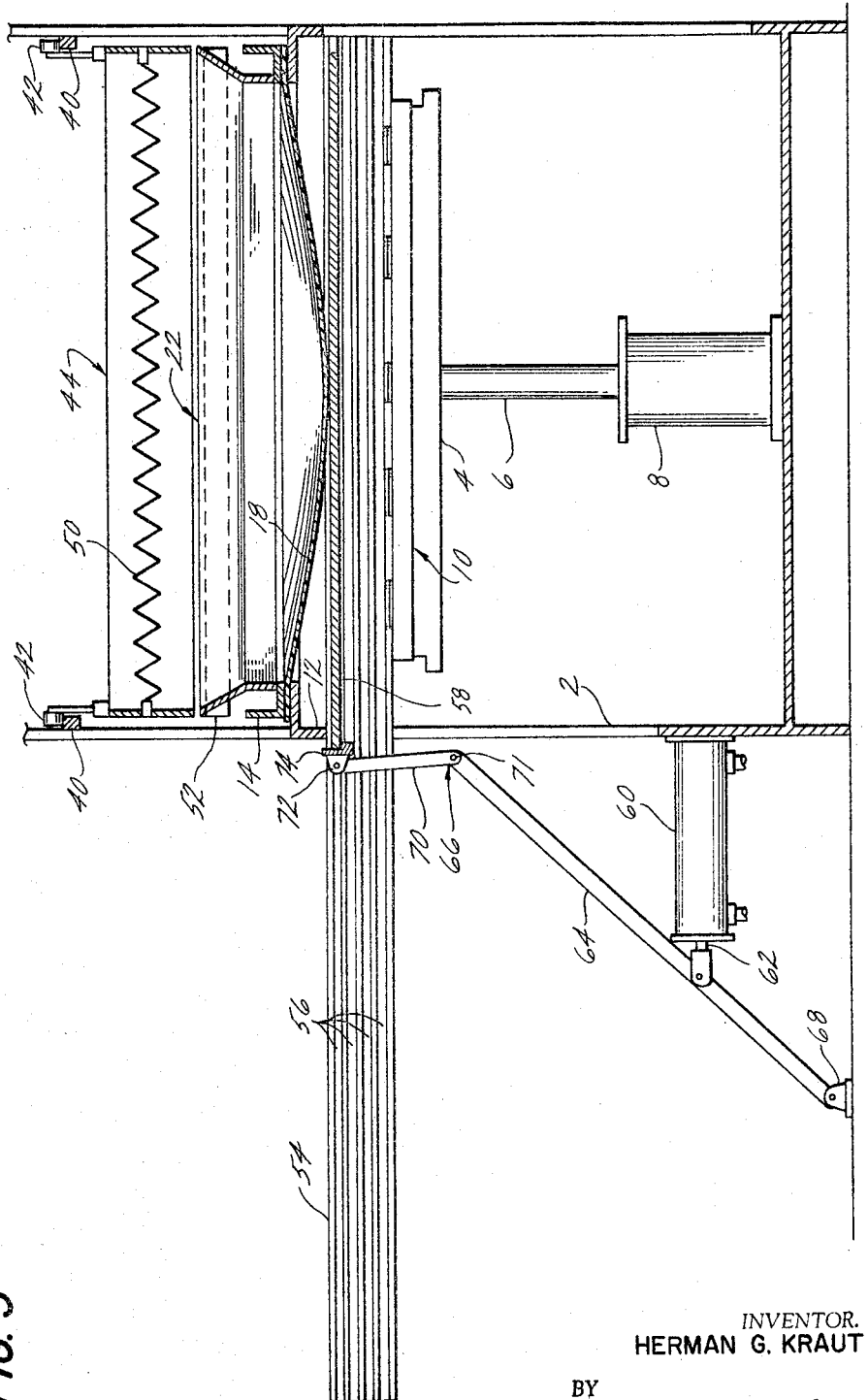
FIGURE 3 is a similar sectional view with the heat shield in operative position and the film rendered deformable by heating.
Figure 4:
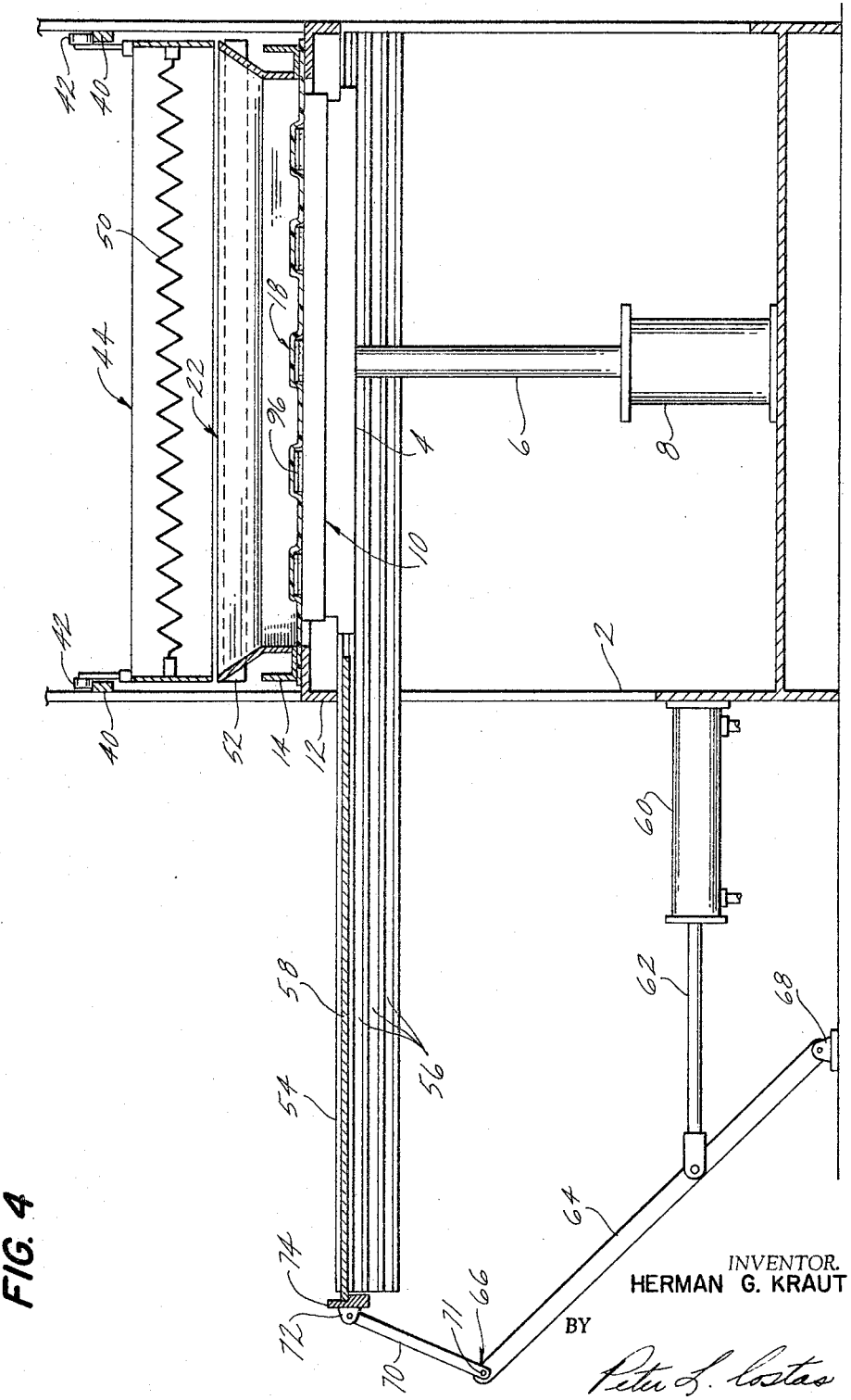
FIGURE 4 is a similar sectional view during the vacuum portion of the cycle.

Slidably mounted above the clamping frame 14 and heat reflector 22 upon the tracks 40 by the rollers 42 is a heater unit generally designated by the numeral 44. The heater unit 44 is movable by the air cylinder 46 and piston 48 into and away from a position overlying the reflector 22 and the film 18 clamped between the clamping frame 14 and clamp portion 12. Generally, such heater units contain a plurality of spaced resistance coils or rods 50 as seen in FIGURES 3 and 4, and, because of their spacing and proximity to the film 18, tend to be non-uniform in the heat supplied across the film 18. In its retracted position shown in FIGURES 1 and 5, the heater unit 44 is insulated from the film 18 by an insulating member 52 of asbestos or other suitable material supported on the frame 2 therebetween.

Figure 2:
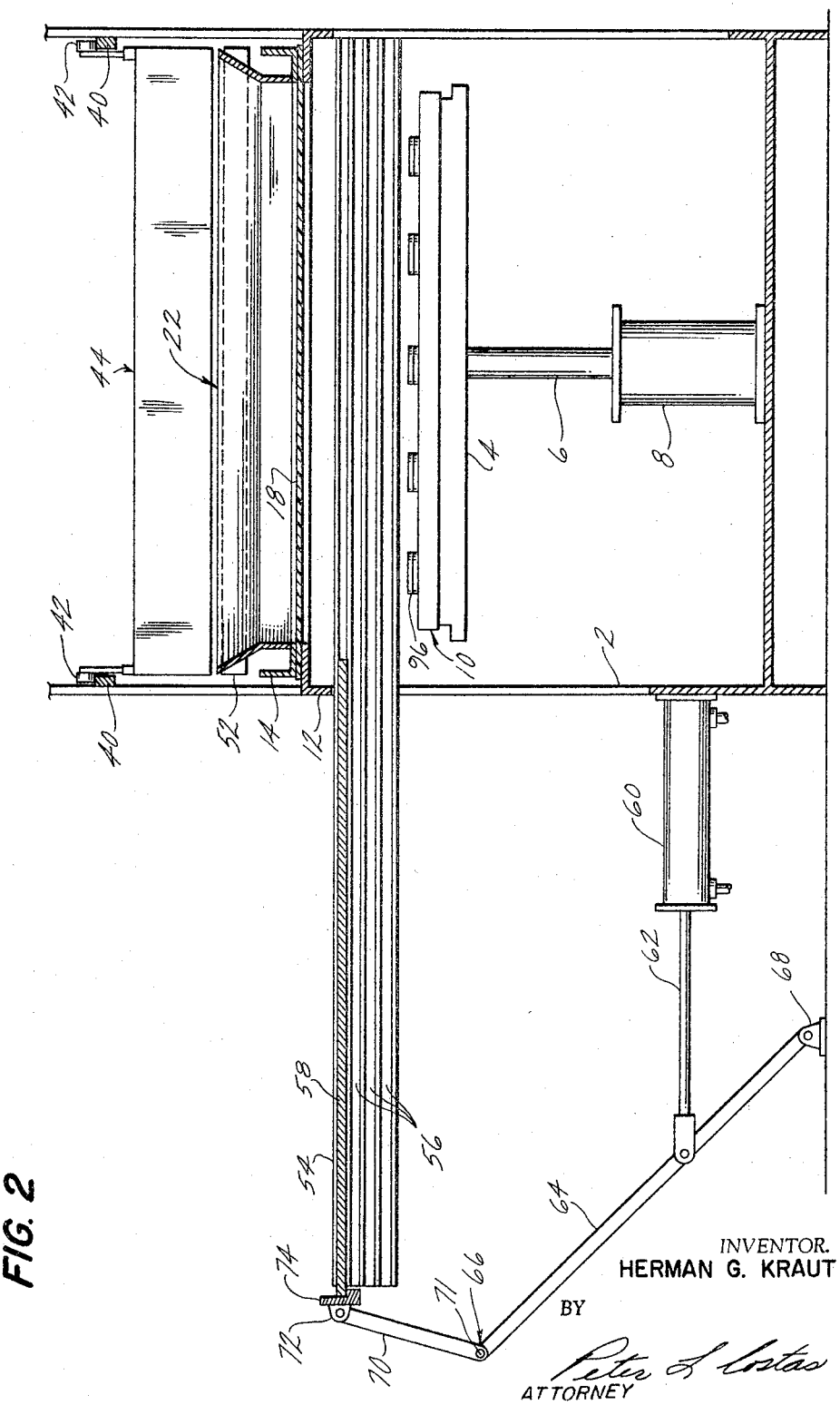
FIGURE 2 is a sectional view of the apparatus generally along the line 2—2 of FIGURE 1 at the start of the operating cycle with the shield in inoperative position.

Mounted on the frame 2 below the clamp portion 12 are a pair of elongated track members 54 which extend rearwardly of the frame 2 as seen in FIGURES 2–4. The track members 54 provide a plurality of parallel, horizontally extending trackways 56 in one pair of which a heat shield member 58 is slidably supported for movement into operative position underlying the clamp portion 12 and clamped film 18 and overlying the platform 4 and for movement into inoperative position rearwardly of the platform 4 and clamp portion 12. The plurality of trackways 56 permit the heat shield member 58 to be varied vertically in its proximity to the clamped film 18 and the platform 4 as to compensate for the height of articles being packaged and to permit variation in the heat reflection therefrom into the bottom surface of the clamped film 18 as well as to limit the amount of contact with the film as it sags upon heating.

Sliding movement of the heat shield into and from operative position is effected by the air cylinder 60 and its piston 62 which is pivotally connected to the long arm 64 of the knuckle assembly generally designated by the numeral 66. The long arm 64 is pivotally mounted at its lower end in the fixed mounting bracket 68 and at its upper end is pivotally connected to the lower end of the short arm 70 by the pin 71. The short arm 70, in turn, has it supper end pivotally connected to the mounting bracket 72 on the stiffener bar 74 at the rear of the heat shield member 58. It can be seen that a relatively short stroke of the piston 62 will move the heat shield member from a position overlying the platform to a position outwardly or rearwardly thereof. As previously indicated, the heat shield member 58 preferably has a reflective upper surface and thus is conveniently a bright or polished metal plate such as aluminum although an insulating material may be employed as may a laminated or composite construction.

Support rollers 76 on the frame are aligned horizontally with the conveyor (not shown) feeding the loaded support members 10 into the apparatus in vertical alignment with the platform 4. As seen in FIGURE 8, a typical support member 10 includes a metal pan or tray 78 having a multiplicity of perforations 80 spaced about the bottom wall thereof, a wire screen element 82 seated thereon, and a fibrous lower spacing element 84 such as pegboard having a multiplicity of perforations 86 spaced thereabout. An intermediate wire screen element 88 is disposed thereon and a fibrous top spacing element 90 such as plywood having a multiplicity of perforations 92 spaced thereabout completes the assembly of the support member 10. In preparing the skin-packaging sub-assembly, an air-pervious substrate 94 such as porous paperboard is placed upon the support member 10 and the articles 96 to be packaged are placed thereon, generally in a predetermined pattern indicated by repetition of a printed pattern representing individual cards to be severed from a large substrate 94 after completion of the bonding of the film thereto.

Suction or air pressure supplied through the conduit 98 and valve 100 from the suction pump 102 or pressure pump 104 is transmitted through the hollow platform 4 and through the perforations 80, 86 and 92 and wire screen elements 82, 88 which serve to provide lateral air passages and thence to the bottom surface of the substrate 94 where it is then diffused throughout the substrate 94.

The various air cylinders are operated by air pressure supplied to the opposed ends thereof in accordance with conventional practice. Most desirably, the operation of the air cylinders and heaters is controlled by a programming means or circuit such as provided by timing cams, timers or limit switches to provide the desired sequence automatically. Various other conventional operating elements have been omitted for clarity of illustration.

Referring now in detail to the operation of this embodiment, the assembly of support member 10 and the packaging sub-assembly comprised of the substrate 94 and articles 96 is fed into the apparatus on the support rollers 76 for sealing upon the platform 4 as seen in FIGURES 1 and 2 at the commencement of a cycle. In this initial position, a length of film 18 is clamped between the clamping portion 12 of the frame 2 and the clamping frame 14 in a position overlying the skin-packaging sub-assembly and platform 4. As seen in FIGURE 1, the end of the film adjacent the discharge end extends over the table element 30 of the release bar assembly 28 which is held downwardly by the clamping frame 14. In this initial position, the heater unit 44 is withdrawn to an inoperative position over the insulating member 52 and to the side of the clamping frame 14 and reflector 22, and the heat shield member 58 is withdrawn to inoperative position rearwardly or outwardly from the platform 4.

In FIGURE 3, the heater unit 44 has been moved into operative position overlying the reflector 22 and the length of film 18 clamped by the clamping frame by the air cylinder 46 and the heat shield member 58 has been moved by the air cylinder 60 into a position between the clamped length of film 18 and the packaging sub-assembly on the platform 4. In this figure, current has been supplied to the heater unit 44 sufficient to heat the film to deformability and the film has distended or sagged under its own weight so that the center thereof is resting upon the heat shield member 58. In this respect, the heat shield member has proven of further advantage in that it supplies a measure of support for the distending film as heating is continued to ensure the desired degree of deformability or activation in the case of adhesive coatings or laminates or of surface-treated films and to prevent premature contact with the article. This support may be particularly advantageous in the use of thicker films.

In FIGURE 4, the heat shield member 58 has been withdrawn by the cylinder 60 from its operative position to an inoperative position outwardly of the platform 4 and the cylinder 8 has elevated the platform 4 to bring the packaging sub-assembly thereon into contact with the heated length of film 18 in the clamping frame 14 as vacuum is being drawn by the vacuum pump 102 through the conduit 98 and thence through the hollow platform 4, the pervious support member 10 and the substrate 94. In this figure, the apparatus is shown as the platform 4 has reached the upper point of its travel and the film 18 has been drawn into a sheath about the article 96 and into laminar contact with the substrate 94 thereabout. In this particular illustration, the heater unit 44 is shown as still in operative position for providing a relatively small portion of the heating cycle during the period immediately following withdrawal of the heat shield member 58 during which the platform 4 moves the packaging assembly into contact with the film with the vacuum being drawn through the substrate 94. Generally, this period may vary from about 1 to 3 seconds in duration and may be desirably employed with thicker films or where an adhesive coating is employed or where a deep draw is to be effected.

In FIGURE 5, the heater unit 44 has been withdrawn to inoperative position. After the vacuum cycle had been completed and preferably after the packaging assembly had been cooled, the cylinder 24 has raised the free end of the clamping frame 14 which in turn has released the release bar assembly 28. The springs 38 have biased the table element 30 upwardly serving to facilitate disengagement of the film 18 from the support member 10 and the clamp portion 12. A conveying and cutting assembly (not shown) has gripped the length of film outwardly of the table element and commenced to draw it towards the discharge end (the left hand side in the illustration) moving the packaging assembly to the side of the platform 4 which is being lowered by the cylinder 8. After the conveying and cutting has been completed, the packaging assembly will be discharged and a fresh length of thermoplastic film will be disposed over the clamp portion 12 in preparation for the next complete cycle.

Figure 6:
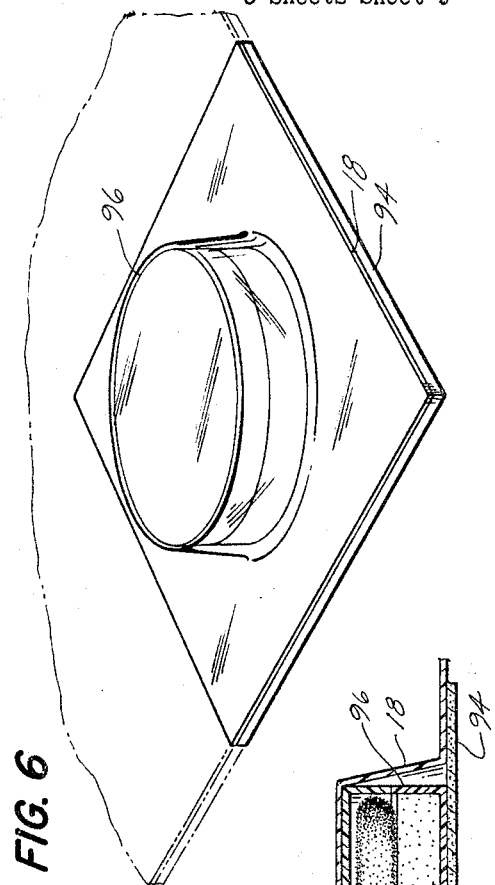
FIGURE 6 is a fragmentary perspective view of a skin-packaging assembly produced by the present invention.
Figure 7:
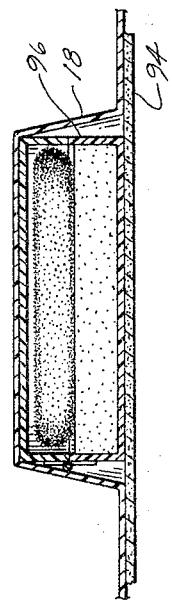
FIGURE 7 is a fragmentary sectional view thereof generally along the line 7—7 of FIGURE 6.

A skin-packaging assembly produced by the present invention is fragmentarily illustrated in FIGURE 6 and 7. In this particular assembly, the article 96 is a ladies compact having a heat-sensitive or thermoplastic casing. In accordance with the method of the present invention, the film 18 is drawn tightly about the article 96 to form a tight-fitting sheath and into laminar contact with the paperboard substrate 94 surrounding the article. Unlike methods which shield or shadow the film overlying the article from heat, the portions of the film overlying the article and the substrate have been uniformly heated and the portion overlying the article has been drawn into extremely skin-tight contact with the upper surface of the article and about the periphery thereof to form the highly desirable, close-fitting sheath. A reduction of film thickness will be apparent in the side of the sheath portion as will be flow lines upon microscopic examination. The film has substantially uniform appearance and characteristics throughout the packaging assembly, particularly in both the top portion of the sheath portion and the laminar portion overlying the substrate since it has been uniformly heated. However, variation in thickness and some variation in appearance and properties will generally occur in the highly drawn, generally vertically extending portion of the sheath due to the drawing thereof. The product is substantially free from evidence of heat injury and thus provides a desirable and attractive package.

Illustrative of the efficacy of the present invention is the following sepcific example.

*Example*

A toy construction set containing a plurality of parts was skin-packaged using apparatus substantially as illustrated in FIGURES 1–5 of the attached drawings. The substrate was a porous substantially imperforate patent coated paperboard of approximately 0.030 inch in thickness, and the film employed was a surface-treated polyethylene film of about 6 mils in thickness. Among the components of the construction set placed at predetermined locations about the upper surface of the substrate was a drum hoist assembly 2½ inches in height and a number of synthetic plastic parts including extremely heat-sensitive thermoplastic wheel hub caps ¾ inch in height and 2¼ inch in diameter and boiler caps 1 inch in height and 2½ inches in diameter. The heat shield member was an aluminum sheet of about 0.125 inch in thickness.

The skin-packaging subassembly was placed upon the platform member and the heat shield member was moved into operative position underlying the film and overlying the entire skin-packaging subassembly. Electrical current was supplied to the heater unit for a total of 5½ seconds and the heat shield member was withdrawn to inoperative position as the platform member was being moved upwardly towards the end of the heating cycle. The portion of the heating cycle following the withdrawal of the heat shield member was about 1½ seconds as the elevator platform moved the skin-packaging subassembly into contact with the heated film while a vacuum was being drawn through the substrate. The vacuum was drawn for a period of about 10 seconds commencing with the elevation of the platform into proximity to the film. The vacuum drew the film into a tight-fitting sheath about the various articles and as the platform reached the upper extremity of its movement, the heater was indexed to inoperative position and a cooling fan circulated air over the packaging subassembly to cool the film.

Upon indexing, cutting and removal of the packaging assembly from the apparatus, it was found that the film closely conformed to the periphery of the various articles and was in laminar contact with the substrate throughout the area therebetween and around the margins of the substrate outwardly thereof. The film was bonded to the substrate by its own substance with portions of the film extending inwardly of the portion of the paperboard. Inspection of the various components of the toy construction set, including the highly heat-susceptible boiler caps and hub caps, indicated no evidence of injury by heat or deterioration. Visual inspection of the film indicated that it had substantially uniform appearance across the tops of the various articles and in the portion in laminar contact with the substrate, although some variation in appearance was apparent in the deeply drawn portions of the sheaths surrounding the peripheries of the articles.

Attempts to skin-package this particular assembly without the heat shield member using similar conditions produced melting, deformation and deterioration in properties and appearance of various of the thermoplastic parts and particularly the boiler caps and hub caps.

As will be readily apparent from the foregoing detailed specification and drawings, the present invention provides a novel method and apparatus for skin-packaging articles between a thermoplastic film and an air-pervious substrate which are advantageous in providing for uniform heating of the thermoplastic film while providing shielding of the articles from injury by heat. The film is drawn into a tight-fitting sheath about the articles and exhibits substantially uniform appearance and characteristics both in the sheath and in the laminar portions. The resultant skin-packaging assemblies are attractive, relatively economical and free from injury to the articles.

Having thus described the invention, I claim:

1. In the method of skin-packaging articles between an air-pervious substrate and a thermoplastic film, the steps comprising placing an article on the upper surface of an air-pervious substrate to form a packaging subassembly; supporting a length of thermoplastic film about its margins in spaced, generally parallel relationship above said packaging subassembly; supporting between said film and packaging subassembly a heat-resistant shield member dimensioned and configured to overlie substantially all of said packaging subassembly; directing heat downwardly into said film sufficient to heat said film to deformability, said shield member substantially shielding said packaging subassembly from the heat; withdrawing said shield member from its position between said heated film and packaging subassembly; and moving said packaging subassembly and heated film into contact while drawing vacuum through said substrate, said vacuum drawing said heated film downwardly about said article into a close-fitting sheath and into laminar contact with said substrate surrounding said article, said film being bonded to said substrate upon being drawn into laminar contact.

2. The method in accordance with claim 1 wherein said substrate is a porous paperboard material and said film is a polyolefin film with its lower side surface-treated and wherein said film is heated sufficiently to render the film deformable and to activate the treated surface for heat-sealing to the paperboard base sheet while maintaining substantially the integrity of the body of the film.

3. The method in accordance with claim 2 wherein said film is polyethylene film of about 2 to 11 mils in thickness.

4. The method of claim 1 wherein said shield member has a reflective upper surface to reflect heat passing through said film upwardly against the bottom surface of said film.

5. The method of claim 1 wherein said film has an adhesive on its lower surface.

6. The method of claim 1 wherein said article has an upper surface portion which is sensitive to heat.

7. The method of claim 1 wherein heat is directed into said film for a relatively short period of time after withdrawal of said shield member.

8. The method of claim 1 wherein said shield member is withdrawn after heating of said film has been effectively terminated.

9. In the method of skin-packaging articles between an air-pervious substrate and a thermoplastic film, the steps comprising placing an article on the upper surface of a porous paperboard to form a packaging subassembly; supporting a length of polyolefin film about its margins in spaced, generally parallel relationship above said packaging subassembly, said film having its lower side surface-treated; supporting between said film and packaging subassembly a heat-resistant shield member having a reflective upper surface and dimensioned and configured to overlie substantially all of said packaging subassembly; directing heat downwardly into said film sufficient to heat said film to deformability and to activate the treated surface while maintaining substantially the integrity of the body of the film, said shield member substantially shielding said packaging subassembly from the heat; withdrawing said shield member from its position between said heated film and packaging subassembly; and moving said packaging subassembly and heated film into contact while drawing vacuum through said porous substrate, said vacuum drawing said heated film downwardly about said article into a close-fitting sheath and into laminar contact with said substrate surrounding said article, said film being bonded by its own substance to said substrate upon being drawn into laminar contact with portions of the lower side thereof extending into the pores of the paperboard substrate.

10. The method of claim 9 wherein said polyolefin film is polyethylene film of about 2 to 11 mils in thickness.

11. The method of claim 9 wherein heat is directed into said film for a relatively short period of time after withdrawal of said shield member.

12. In apparatus for skin-packaging articles between an air-pervious substrate and a synthetic thermoplastic film to form a skin-packaging assembly, the combination comprising a frame; clamping means in said frame for supporting a length of thermoplastic film about its margins; support means for a skin-packaging subassembly spaced below said clamping means; heating means above said clamping means for heating a length of film in said clamping means to deformability; and a heat shield member mounted for movement into an operative position between said clamping means and support means and into an inoperative position outwardly of said support means.

13. The apparatus of claim 12 wherein said heating means is mounted for movement from an operative position above said clamping means to an inoperative position outwardly therefrom.

14. The apparatus of claim 12 wherein said heat shield member has a reflective upper surface.

15. The apparatus of claim 12 wherein said support means is movable within said frame towards and from said clamping means to move a packaging subassembly supported thereon into contact with a length of film supported in said clamping means.

16. The apparatus of claim 12 wherein said heat shield member is dimensioned and configured to underlie substantially all of said clamping means inwardly of the margins thereof.

17. In apparatus for skin-packaging articles between an air-pervious substrate and a synthetic thermoplastic film to form a skin packaging assembly, the combination comprising a frame; clamping means in said frame for supporting a length of thermoplastic film about its margins; support means for a skin-packaging subassembly spaced below said clamping means; heating means above said clamping means for heating a length of film in said clamping means to deformability; a heat shield member mounted for movement into an operative position between said clamping means and support means and into an inoperative position outwardly of said support means; and power means for moving said heat shield member into and from said operative position.

18. In apparatus for skin-packaging articles between an air-pervious substrate and a synthetic thermoplastic film to form a skin-packaging assembly, the combination comprising a frame; clamping means in said frame for supporting a length of thermoplastic film about its margins; support means for a skin-packaging subassembly spaced below said clamping means; heating means above said clamping means for heating a length of film in said clamping means to deformability upon supply of energy thereto; a heat shield member mounted for movement into an operative position between said clamping means and support means and into an inoperative position outwardly of said support means; power means for moving said heat shield member into said positions; power means for moving one of said clamping means and support means towards the other to effect contact between a packaging subassembly supported on said support means and film supported in said clamping means; and control means for operating said first and second mentioned power means and supplying energy to said heating means.

19. The apparatus of claim 18 wherein said control means is operative to terminate the supply of energy to said heating means prior to movement of the shield member into inoperative position, said control means operating said power means for moving one of said clamping means and support means after operating said first-mentioned power means to said shield member into inoperative position.

20. The apparatus of claim 18 wherein said control means is operative to terminate the supply of energy to said heating means shortly after movement of said shield member into inoperative position, said control means supplying power to move said clamping means and support means relative to each other subsequent to movement of said shield member into inoperative position and prior to termination of the supply of energy to said heating means.

21. The apparatus of claim 18 wherein said heat shield member has a reflective upper surface.

22. The apparatus of claim 18 wherein said heat shield member is dimensioned and configured to underlie substantially all of said clamping means inwardly of the margins thereof.

References Cited by the Examiner
UNITED STATES PATENTS

| | | | |
|---|---|---|---|
| 2,861,404 | 11/1958 | Straton. | |
| 2,876,899 | 3/1959 | Maynard | 206—80 |
| 2,989,827 | 6/1961 | Groth. | |
| 3,000,157 | 9/1961 | Ollier et al. | 53—184 |
| 3,022,614 | 2/1962 | Dreyfus et al. | 53—30 |
| 3,053,023 | 9/1962 | Watts | 53—30 |
| 3,090,484 | 5/1963 | Scholl | 206—80 |
| 3,118,262 | 1/1964 | Messick | 53—184 |

FRANK E. BAILEY, *Primary Examiner.*

THERON E. CONDON, *Examiner.*

W. T. DIXSON, S. ABEND, *Assistant Examiners.*